UNITED STATES PATENT OFFICE.

ADOLF ISRAEL AND RICHARD KOTHE, OF ELBERFELD, GERMANY, ASSIGNORS TO THE FARBENFABRIKEN OF ELBERFELD COMPANY, OF NEW YORK.

BLUE TRISAZO DYE.

SPECIFICATION forming part of Letters Patent No. 658,897, dated October 2, 1900.

Application filed July 20, 1900. Serial No. 24,293. (No specimens.)

*To all whom it may concern:*

Be it known that we, ADOLF ISRAEL and RICHARD KOTHE, doctors of philosophy, chemists, (assignors to the FARBENFABRIKEN OF ELBERFELD COMPANY, of New York,) residing at Elberfeld, Germany, have invented a new and useful Improvement in Trisazo Dyes; and we hereby declare the following to be a clear and exact description of our invention.

Our invention relates to the production of valuable trisazo dyestuff, having the general formula:

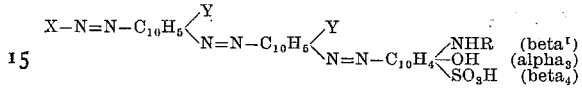

In this formula the group $X-N=N-$ means a radical of a diazo compound—as, for instance, diazobenzene, paraoxydiazobenzene, paraamidodiazobenzene, diazotized sulfanilic acid, diazotizer paraämidosalicylic acid, diazotized amidosulfosalicylic acid, or the like—Y a hydrogen atom which may be substituted by a sulfo group, and R a hydrogen atom which may be substituted by an alkyl radical.

We point out specifically that we intend to denote in the following specification by the term "alkyl radical," as well fatty radicals, as aromatic radicals, and radicals of a similar chemical behavior—such, for instance, as the radical of the acetic acid having the formula $-CH_2-COOH$.

The new process consists in, first, combining a diazo derivative with one molecule of Clève's alphanaphthylaminbetasulfonic acids, (1.6 or 1.7;) secondly, rediazotizing the resulting amidoazo compound and combining the diazo derivative thus obtained with a second molecule of one of the said Clève's acids; thirdly, again diazotizing the resulting amidodisazo dyestuff, and, finally, coupling the diazo compound thus produced with $beta_1$-amido-$alpha_3$-naphthol-$beta_4$-sulfonic acid, or with alkyl derivatives thereof. In case the first or the last component causes a sufficient solubility of the dyestuff the two molecules of Clève's acids can also be replaced once or twice by alpha-naphthylamin.

It may be remarked that if in the above-defined process, for instance, acetylparaphenylenediamin or the like is employed as first component the acetyl group can be split off in a suitable manner after the preparation of the dyestuff.

The dyestuffs produced in the above-defined manner are dark powders having a metallic luster, which dissolve in water with from reddish-blue to blue color. They dye unmordanted cotton in general blue shades (these shades varying from reddish blue to greenish blue) and are distinguished by their fastness to light.

In carrying out our new process practically we can proceed as follows, the parts being by weight: fifteen parts of acetylparaphenylenediamin are diazotized in the usual manner with the aid of forty parts of hydrochloric acid (exhibiting 15° Baumé) and seven parts of sodium nitrite. The resulting diazo solution is stirred into a solution prepared from twenty-five parts of the sodium salt of Clève's alphanaphthylaminbetasulfonic acid, (1.6,) twenty parts of crystallized sodium acetate, and five hundred parts of water, which solution has been cooled to 10° centigrade. After the formation of the dyestuff has been finished the latter is separated from the mixture by the addition of common salt and isolated by filtration. The coloring-matter thus obtained is carefully mixed with five hundred parts of water and then with fifty parts of a hydrochloric acid of 15° Baumé. The resulting mixture is cooled and then slowly mixed with a solution of nine parts of sodium nitrite. When the diazotation has been finished, the separated diazo compound is filtered off. Subsequently it is mixed with a suitable quantity of water and introduced into a watery solution of twenty-five parts of the sodium salt of Clève's 1.6 naphthylaminsulfonic acid, to which a sufficient quantity of sodium acetate has been added. The resulting mixture is stirred for several hours until the formation of the disazo dyestuff having in a free state the formula

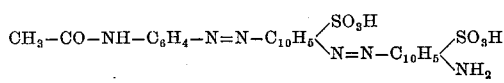

will be finished. This dyestuff is separated with the aid of common salt and filtered off. Subsequently it is carefully mixed with water and fifty parts of a hydrochloric acid of 15° Baumé. To the resulting mixture a solution of nine parts of sodium nitrite is slowly added, while stirring and cooling. The diazo compound thus produced is isolated by filtration, mixed with water, and then stirred into an icy-cold solution of twenty-four parts of beta$_1$-amido-alpha$_3$-naphthol-beta$_4$-sulfonic acid, and thirty-five parts of sodium carbonate ($CO_3Na_2$) in five hundred parts of water. The so-produced trisazo dyestuff is completely salted out by means of common salt, filtered off, and pressed. The dyestuff is then dissolved in one thousand parts of water, which solution is mixed with one hundred and fifty parts of a strong alkaline soda lye (containing thirty-three per cent. of NaOH) and boiled for a short while. Finally one hundred and eighty parts of common salt and one hundred and fifty parts of hydrochloric acid of 15° Baumé are added. The resulting precipitate is filtered off, pressed, dried, and pulverized. It is the sodium salt of an acid having the formula

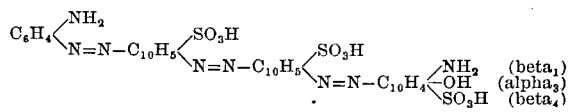

and is a dark powder having a metallic luster which is readily soluble in water with a pure-blue color, the free dyestuff sulfonic acid being precipitated therefrom by the addition of mineral acids. It is soluble with difficulty in alcohol, and it is dissolved by concentrated sulfuric acid (66° Baumé) with a greenish-blue color, which is changed into pure blue on the addition of a small quantity of ice, while on the addition of a larger quantity of ice the dyestuff is precipitated again.

The new coloring-matter dyes unmordanted cotton clear-blue shades which are fast to light.

The process proceeds in an analogous manner if, in the above example, in the first position other diazo compounds are employed, or if in the center position alpha$_1$-naphthylamin-beta$_3$-sulfonic acid is replaced either once or twice by alpha$_1$-naphthylamin-beta$_4$-sulfonic acid, and, as above mentioned, in some cases by alpha-naphthylamin. In the last position beta$_1$-amido-alpha$_3$-naphthol-beta$_4$-sulfonic acid can also be replaced, as hereinbefore pointed out, by alkalized or alphylized derivatives.

Having now described our invention and in what manner the same is to be performed, what we claim as new, and desire to secure by Letters Patent, is—

1. As new articles of manufacture the new trisazo dyestuffs which are alkaline salts of acids having the general formula:

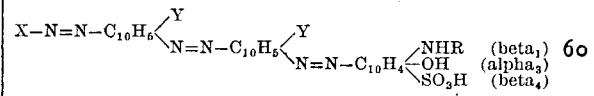

X—N=N— representing in this formula a radical of a diazo compound, Y a hydrogen atom, that may be substituted by a sulfo group, and R meaning a hydrogen atom, which may be substituted by an alkyl radical, and which are dark powders, having a metallic luster, soluble in water with from reddish-blue to blue colors; dyeing unmordanted cotton from reddish-blue to greenish-blue shades which are distinguished by their fastness to light, substantially as hereinbefore described.

2. As a new article of manufacture the new trisazo dyestuff, being an alkaline salt of an acid having the following formula:

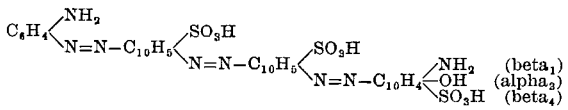

which in the form of the sodium salt is a dark powder having a metallic luster, readily soluble in water with a pure-blue color, the free dyestuff sulfonic acid being precipitated therefrom by the addition of mineral acids; soluble with difficulty in alcohol; being dissolved by concentrated sulfuric acid (66° Baumé) with a greenish-blue color which is changed into pure blue on the addition of a small quantity of ice, while on the addition of a larger quantity of ice a dark precipitate is obtained; dyeing unmordanted cotton clear-blue shades which shades are distinguished by their fastness to light, substantially as hereinbefore described.

In testimony whereof we have signed our names in the presence of two subscribing witnesses.

ADOLF ISRAEL.
RICHARD KOTHE.

Witnesses:
OTTO KÖNIG,
F. A. KITTERSHAUS.